Nov. 11, 1941.  G. L. BRESSON  2,262,664
MEASURING INSTRUMENT
Filed Jan. 3, 1941
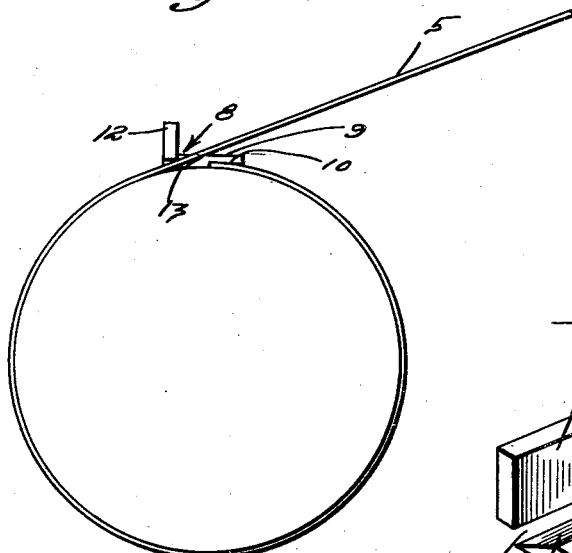
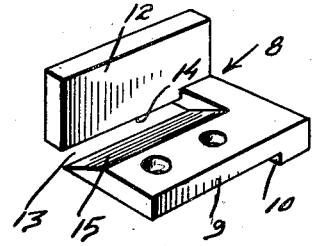
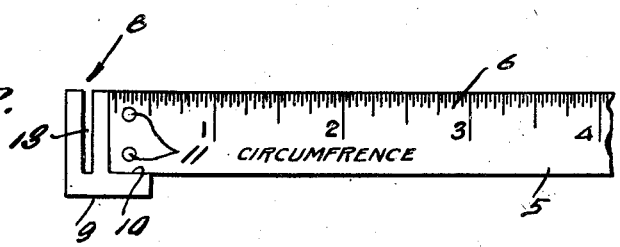
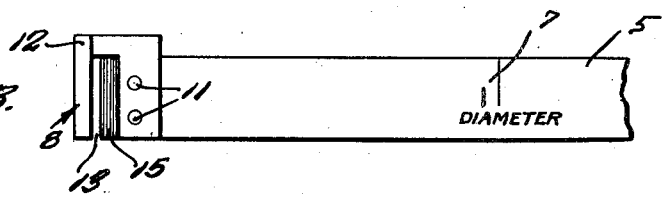
Inventor
Gerard L. Bresson
By Clarence A. O'Brien
Attorney

UNITED STATES PATENT OFFICE 2,262,664

MEASURING INSTRUMENT

Gerard L. Bresson, New Orleans, La.

Application January 3, 1941, Serial No. 373,056

1 Claim. (Cl. 33—179)

This invention relates broadly to the class of measuring instruments, and an object of the invention is to provide an instrument of this character which may be used in the nature of, and as a substitute for calipers in determining the circumference of round objects and, substantially simultaneously with making such determination, immediately ascertain the diameter of such objects.

Briefly the invention consists in a member in the form of a flexible strip suitably graduated on one side thereof for use in determining the diameter of an object, and also suitably graduated on the opposite side thereof whereby on reading such second side one may readily determine the diameter of a given circumference; and the invention together with its objects and advantages will be best understood from a study of the following description taken in connection with the accompanying drawing wherein—

Figure 1 is an edge elevational view showing the device in the form assumed when the same is being put to use.

Figure 2 is a fragmentary plan view of one end of the device showing the same graduated for use in determining the circumference of a given object.

Figure 3 is a view similar to Figure 2 but of the reverse side of the device and showing the same as marked for determining the diameter of a given circumference, and Figure 4 is a perspective view of a plate member forming part of the invention.

Referring more in detail to the drawing it will be seen that in the preferred embodiment thereof the member comprises a tape 5 of metal, fabric, or other suitable material, and of any suitable length and width. The member 5 is provided on one side thereof with a scale 6 that is graduated in terms of inches, and also with the legend "Circumference" as shown, so that this side is used when determining the circumference of a en object.

On the opposite thereof, and as shown in Figure 3, the tape 5 is suitably graduated, or otherwise provided with markings 7 for use in determining the diameter of a given circumference, and also on this side thereof there is suitably displayed on the tape the legend "Diameter" as shown.

At the zero end thereof, the tape 5 has attached thereto a substantially angular, or L-shaped member 8 of metal or other suitable material.

The member 8 has one flange 9 thereof notched on its underside as at 10 to receive one end of the tape 5, and which end of the tape is secured to said flange 9 of the member by rivets or other fastening elements 11.

At the angle between the flanges 9 and 12 the member is provided with a slot 13 through which the free end of the tape is trained as shown in Figure 1, as the tape is placed about the round work, the circumference and diameter of which one desires to ascertain.

The edge 14 of the flange 12 of the member 8 serves as an index adapted to be read against the graduations 6 for determining the circumference of the work; and to insure accuracy, the flange 9 of the member has the edge thereof forming one side of the slot 13 bevelled or feathered as shown, and as indicated at 15.

Obviously when the tape 5 has been passed around the work and trained through the slot 13 to determine the diameter of the work, one may then, by referring to the opposite side of the tape 5 upon removal of the device from the work, determine the circumference of the work having, as just stated, first, through the instrumentality of the device, determined the diameter of the work.

Thus with a device of this character, one need not necessarily have any material knowledge or skill in arithmetic, or restort to any source to obtain the desired information other than the device itself.

The device may also be used to advantage for measuring objects to determine the length thereof, or substantially in the conventional manner as a rule. When so using the device the flange 12 is disposed against the edge of the work and the tape 5 extended from the member 9 in a proper direction relative to the work for determining the length, width, or whatever dimension of the work desired.

It is thought that the simplicity of the device, its manner of use, and utility are all apparent to those skilled in the art and that accordingly further detailed description is unnecessary.

It is also to be undertsood that while I have herein shown and described a preferred embodiment of the invention, I claim all such forms of the invention to which I am entitled in view of the prior art and scope of the appended claim.

Having thus described the invention what is claimed as new is:

As a new article of manufacture, a measuring instrument for determining diameters, circumferences, and lengths, and comprising a graduated tape, an L-shaped member, said L-shaped member having one flange provided with a groove on one face thereof, said tape having an end thereof secured in the groove of said one flange; and said L-shaped member having at the angle between the flanges thereof a slot to which said tape is trainable in determining diameters and circumferences, and said one flange having the edge thereof defining one side of said slot bevelled to present an inclined surface for facial contact with said tape when the latter is trained through said slot; and the other of said flanges adapted to be positioned against one end of work being measured to determine the length thereof.

GERARD L. BRESSON.